Patented Apr. 11, 1950

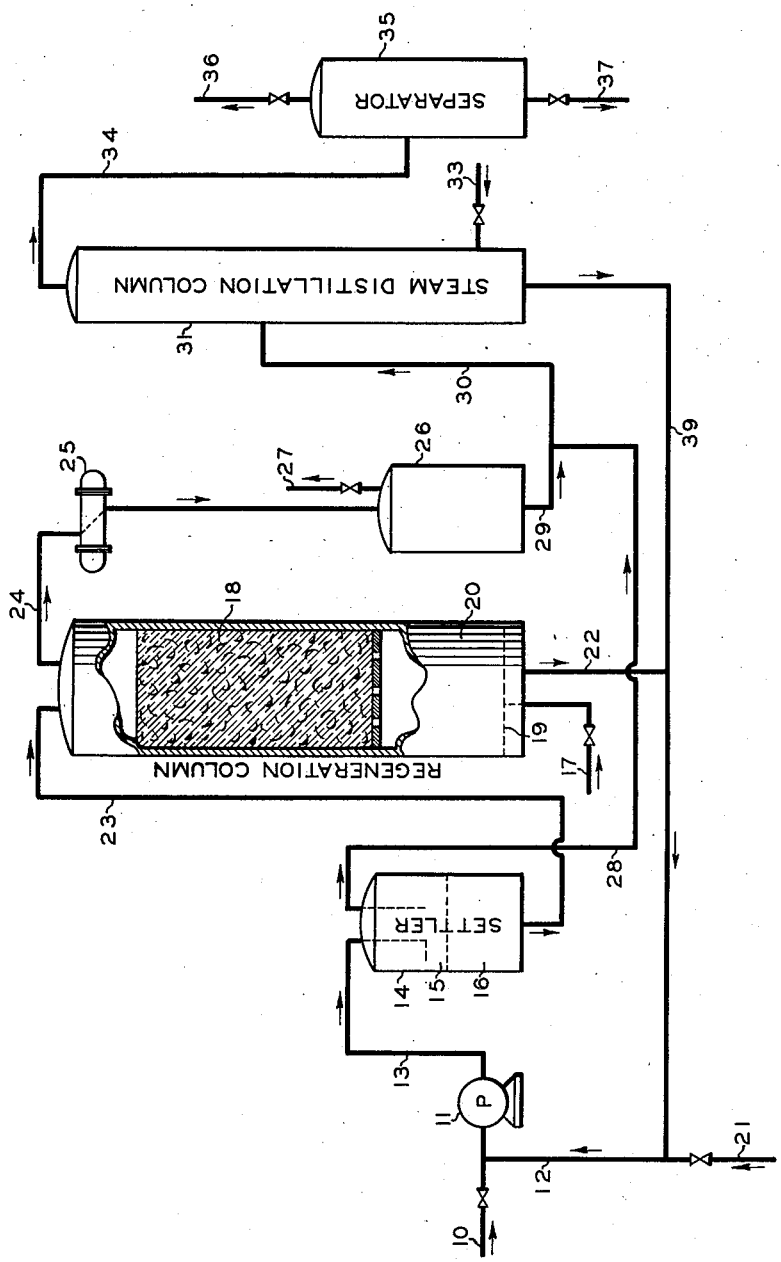

2,503,644

UNITED STATES PATENT OFFICE 2,503,644

MANUFACTURE OF DISULFIDES FROM MERCAPTANS

Paul F. Warner, Borger, and John A. McBride, Phillips, Tex., assignors to Phillips Petroleum Company, a corporation of Delaware Application January 2, 1948, Serial No. 36

18 Claims. (Cl. 260—608)

This invention relates to the oxidation of sulfur-containing compounds. In one aspect this invention relates to the oxidation of compounds having the general formula RSH to the corresponding disulfide. In a more specific aspect this invention relates to a process for the oxidation of sulfur-containing compounds having the general formula RSH to the corresponding disulfide in the presence of an inorganic oxidizing reagent when reagent and reactants are dissolved in an organic solvent.

In the past, small concentrations of mercaptans, such as those naturally occurring in petroleum oils, sour distillates, etc., have been oxidized to disulfides and polysulfides by various sweetening methods for the purpose of eliminating their undesirable odor. In such instances the concentration of mercaptan is very small, generally of the order of 0.01 to 0.03 per cent. The separation and recovery of small amounts of disulfide produced in these processes is economically inadvisable. Furthermore, operating difficulties involved in their separation would generally be very great since the disulfides produced often boil in the same range as the particular oil being sweetened. It is obvious, therefore, that such methods would not be suitable for the production of disulfides in a practical manner.

A well-known method of sweetening involves treatment of the mercaptan-containing hydrocarbon with aqueous cupric chloride and is better known as the copper sweetening process. Such a process would appear to be a suitable means of producing alkyl disulfides from compounds having the general formula RSH. The principal reactions, illustrative of the copper sweetening process, are believed to be shown in the following equations:

(1)
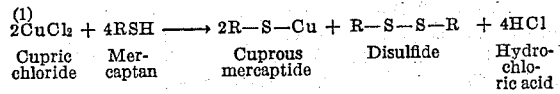

(2)
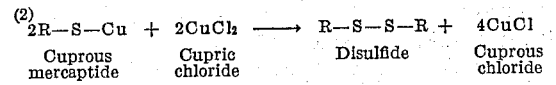

In the first step of the reaction one-half of the mercaptan is converted to the corresponding disulfide and the rest is left as cuprous mercaptide. The latter then reacts (as shown in Equation 2) with additional cupric chloride to give the corresponding disulfide and cuprous chloride. On combining the two equations into one, the ultimate reaction is:

(3)
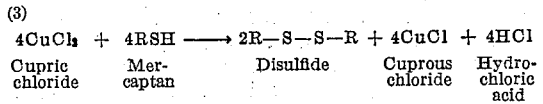

Since cuprous chloride and hydrochloric acid are formed in the reaction at the expense of the cupric chloride, the reagent will gradually lose its activity and finally become spent. Consequently it is common practice to conduct the reaction in the presence of air or an equivalent gas containing free oxygen. In this manner the cuprous chloride and hydrochloric acid, formed as above shown in the sweetening step, react with oxygen to give cupric chloride and water (as shown in Equation 4):

(4)
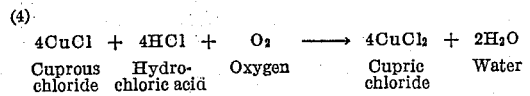

The cupric chloride is thus regenerated continuously and the reagent remains in a highly active state over a long period of time. As shown above, the reactions in the copper sweetening process involve an ionic interchange and for that reason an ionizing medium, preferably water, must be present. In such a case, the aqueous solution phase must be retained in order to maintain the presence of cupric and cuprous ions in the reaction mixture, without which the acid formed in the first step (Equation 1) is not held by the reagent, and thus the reagent cannot be regenerated. The reaction effluent would then contain acid and mercaptide.

We have found that, when reacting a mercaptan-rich stock, to prepare disulfides from mercaptans by oxidation by a direct application of the copper sweetening process to such as commercial grade mercaptan stocks, i. e. stocks containing mercaptan in an amount of 90 per cent or higher, cuprous mercaptides are formed in such a concentration that they precipitate from the reaction mixture. As shown by the equations above, for reaction 2 to proceed satisfactorily it is necessary for the cuprous mercaptide to remain dissolved in the reaction mixture in order to provide for the proper contacting of the reactants with the oxidizing agent. We have found that it is desirable to employ a reaction medium in which the reactants, including cuprous mercaptide, have a relatively high degree of solubility.

Various advantages are inherent from the use of cupric chloride as the oxidizing reagent in an oxidation process for the manufacture of disulfides from mercaptans. However, the successful application of the cupric chloride process above described to the manufacture of disulfides from mercaptans is contingent upon retaining the total reactants, including the mercaptides, in solution. This necessitates maintaining a relatively low concentration of mercaptan in the reaction zone.

An object of this invention is to provide an improved process for the production of disulfides.

Another object is to provide a process for the catalytic oxidation of selected compounds having the general formula RSH to corresponding disulfides.

Another object is to provide a process for oxidation of mercaptans to the corresponding disulfide in the presence of cupric chloride as the oxidizing agent when the reactants and said reagent are dissolved in an organic solvent comprising a glycol monoalkyl ether.

Still another object is to provide a unique dehydration system in a process for the oxidation of mercaptans to the corresponding disulfides.

It is yet another object to provide a means for recovering and purifying disulfide product in a process for the oxidation of a mercaptan to the corresponding disulfide.

Other objects will be apparent to those skilled in the art from the accompanying discussion and disclosure.

We have now found that disulfides can be produced in economically significant quantities by a continuous cupric halide process utilizing a charge stock containing mercaptans in any desired concentration. Mercaptan compounds are considered herein to comprise those having the general formula RSH wherein R is an alkyl, aryl, aralkyl or cyclo aliphatic radical. Preferably, said aryl, aralkyl and cyclo aliphatic radicals contain a maximum of 8 carbon atoms and said alkyl radical contains a maximum of 12 carbon atoms.

By our process substantially complete instantaneous conversion of mercaptans can be effected without loss in the formation of higher polysulfides or other undesired by-products. We carry out the oxidation in an organic solvent or medium in which the copper oxidizing reagent, the intermediate compounds, and the mercaptan reactants are soluble. The organic solvents of our invention comprise the monoalkyl glycol ethers wherein said alkyl contains preferably not more than 6 to 8 carbon atoms and wherein said glycol is preferably ethylene glycol, diethylene glycol, propylene glycol or dipropylene glycol. However, the monoalkyl ethers of higher molecular weight glycols can be utilized with certain modifications, if desired.

In accordance with the process of our invention we utilize a charge stock containing a selected mercaptan in any desired concentration for oxidation to the corresponding disulfide. Charge stock is introduced to an oxidation zone containing an oxidizing solution at a maximum temperature of 175° F., preferably in the range of 80-160° F. Oxidizing solutions referred to herein comprise copper halide oxidizing reagent dissolved in one or more of the glycol ether solvents above described. The oxidizing solution contains cupric ions and chloride ions and/or bromide ions and although it may comprise an admixture of a soluble cupric chloride, and/or soluble cupric bromide with water and the glycol ether, it is not limited thereto. The oxidizing solution may comprise an admixture of a soluble cupric salt, a soluble chloride and/or bromide salt with the glycol ether and water, the essential element being the presence of cupric and chloride and/or bromide ions. Water concentrations in the oxidizing solution, usually in the range of 3 to 20 per cent can be utilized, although usually the preferred range is 5 to 10 per cent. For example, an oxidizing solution may comprise cupric chloride dihydrate, and the glycol ether solvent together with water, the amount of water present not exceeding 20 weight per cent. On the other hand, an oxidizing solution may comprise cupric sulfate, ordinary sodium chloride, water in the preferred concentration of 5 to 10 weight per cent, and the particular glycol ether selected.

Conversion of mercaptans to the corresponding disulfide product is substantially instantaneous and complete. Oxidizing solution is usually regenerated by passing a stream of air or equivalent oxygen-containing gas through the partially spent solution either in situ or in a regeneration zone external to the oxidation zone. Oxidizing solution and disulfide product are recovered from the effluent of the oxidation zone and the former is recycled to the oxidation zone. Separation of the disulfide product from the oxidation zone effluent is greatly simplified when the preferred solvents of our invention are employed. For instance, when employing diethylene glycol monomethyl ether or ethylene glycol monomethyl ether, two partially miscible liquid phases form in the oxidation zone, the one rich in disulfide product, and the other rich in oxidizing solution. The disulfide phase has a purity of 90 per cent or higher and contains solvent and small amounts of oxidizing reagent as impurities. When employing others of our solvents, such as for example, monobutyl ether of ethylene glycol, or monobutyl ether of diethylene glycol, a single liquid phase effluent may be obtained. In such cases other known separation means are utilized in the recovery of disulfide product and of oxidizing solution for recycle to the oxidation zone.

The presence of water in the oxidation zone is critical in carrying out our process, not only with respect to its function as an intermediate ion carrier, but also with respect to the solubility of the specific disulfide product in the particular glycol ether utilized. We have found that our solvents retain the copper reagent, including the intermediate products and the mercaptan reactants in solution when water is present in the reactant mixture in concentrations not exceeding from 18 to 20 per cent by weight. At concentrations thereabove, mercaptides begin to precipitate from solution. A preferable range of concentration is 3-10 per cent. When oxidizing tertiary butyl mercaptan in accordance with our process using a glycol ether solvent such as monomethyl ether of diethylene glycol or of ethylene glycol, two liquid phases are recovered from the affluent of the oxidation zone when the concentration of water in the oxidizing solution is at least 3 per cent and preferably 5 to 10 per cent. When water concentrations therein are substantially below 3 per cent, the disulfide product and the diethylene glycol monomethyl ether solvent are highly miscible in each other and, in the absence of water, are miscible in all proportions. As shown in Equation 4 water is obtained as a by-product of regeneration. Accordingly, the by-product water must be removed from the oxidizing solution so as to maintain its concentration in the oxidizing solution in the oxidation zone, in the preferred range, and in any case, below the maximum allowable 18 to 20 per cent. Complete removal of water from the oxidation zone is undesirable for reasons already discussed. We prefer, therefore, to remove regeneration by-product water from the system at such a rate as to maintain a concentration of water in the oxidation zone in the range of 3 to 10 per cent by weight.

The oxidizing solution is necessarily regenerated for the reasons discussed hereinbefore. Oxidizing solution in effluent from the oxidation zone is partially spent to an extent that in most instances the cupric reagent is in a state of about 90 per cent reduction. We find that satisfactory rates of conversion of mercaptans in the oxidation zone can be maintained when we oxidize the partially spent oxidizing solution to an oxidized state of about 90 per cent. Although a higher state of oxidation can be effected, we prefer the presence of some reduced ions since in such cases we have found no evidence of peroxide formation. As discussed above, we prefer to regenerate partially spent oxidizing solution by contacting it with a dissolved oxygen-containing gas to effect the regeneration as illustrated by Equation 4. The rate of regeneration may be controlled by varying the rate at which the oxygen-containing gas flows through the partially spent solution. The temperature is preferably kept below 175° F. in order to avoid the formation of insoluble copper compounds which are of no value in the oxidation zone. We control the extent of regeneration effected as a function of the oxidation-reduction potential in the reactivated solution, as measured by a platinum electrode in a saturated KCl—HgCl half cell against the regenerated oxidizing solution. Thus the E. M. F. or potential difference of the half cell oxidizing solution/Pt is measured against the calomel half cell. We have found that when the oxidizing solution is completely oxidized the oxidation-reduction potential is 440 mv. and at the state of 50 per cent reduction this potential is 395 mv.; at zero potential difference, reduction is complete. The measurement of the oxidation-reduction potential affords a convenient way to control the rate of conversion. The optimum oxidation-reduction potential for any given reaction may be readily determined by experiment. Thus, for the oxidation of tert.butyl mercaptan in a process in which the oxidizing solution is regenerated in situ, the preferred oxidation-reduction potential is in the range of 300–325 mv.

We effect the removal of excess by-product water of the regeneration by means of the excess air or other oxygen-containing gas passing through the solution during the regeneration step. The efficiency of the removal of water from the regeneration zone is, of course, dependent upon the required regeneration conditions of temperature and flow of regeneration gas.

We have found that when a flow of air 300 per cent in excess of the theoretical amount required for regeneration is employed, complete removal of excess by-product water from the oxidizing solution is effected. However, when employing 100 per cent excess air flow only about 50 per cent of the required removal of by-product water is effected. We have found, however, that we can effect efficient removal of by-product water, by the introduction of a paraffin hydrocarbon boiling in the range of about 140 to about 160° F. to the regeneration system usually in a ratio in the range of 1:1 to 1:3 to the mercaptan oxidized, but this ratio depends of course upon the amount of excess air employed. For example, when oxidizing tertiary butyl mercaptan in accordance with our process, we may add normal hexane to the regeneration zone in a volume ratio to the oxidized mercaptan of 1:1 at a regeneration gas flow in 100 per cent excess and effect thereby a removal of by-product water from the regeneration zone at an efficiency of substantially 100 per cent. Normal hexane passes overhead from the regeneration column with the excess by-product water. It is to be pointed out that the paraffin hydrocarbons boiling in the range of 140–160° F. do not form azeotropes with water.

Solvents receptive to the utilization of the paraffin hydrocarbon in the removal of regeneration by-product water are those which form non-azeotropic mixtures therewith, such as for example, the monomethyl ether of diethylene glycol.

As pointed out hereinabove, the use of the preferred solvents of our invention results in the formation of two liquid phases in the effluent from the oxidation zone. When these preferred solvents are employed certain advantages with respect to product recovery are realized. For example, when diethylene glycol mono methyl ether is utilized, a disulfide-rich liquid phase is recovered from the effluent and only a single final purification step is required.

When two liquid phases are recovered from the oxidation zone, the disulfide-rich phase may be purified by conventional means such as water washing and/or fractionation. However, in some instances the specific solvent being utilized forms a non-azeotropic mixture with water and the purification of the disulfide phase can be effected more advantageously by steam distillation. Thus, in the rectification of the system water, diethylene glycol monomethyl ether, and the disulfide product, the water and disulfide are recovered as the overhead product and the solvent is retained as kettle product. A substantially pure disulfide product is obtained upon drying this overhead product.

Depending upon the specific mercaptan oxidized and the specific solvent utilized various modifications of our apparatus and of our process may be employed and are within the nature and scope of this invention.

Other advantages of our invention will be apparent from the description of the accompanying diagrammatic sketch which illustrates one type of apparatus in which the objects of the invention may be accomplished. In this explanation reference is made to specific feed stocks and operating conditions, both as an aid to clarity in description and as an example of the operation of our invention. Limitation of the process to these specific materials and conditions is neither implied or intended.

Referring now to the drawing, tertiary butyl mercaptan is introduced to centrifugal contactor 11 through line 10 simultaneously with an oxidizing solution comprising cupric chloride dihydrate dissolved in diethylene glycol monomethyl ether, which is passed to contactor 11 through line 12.

The temperature within contactor 11 is preferably in the range of 120 to 160° F. and oxidation therein of tertiary butyl mercaptan is substantially instantaneous and the conversion is substantially complete. The effluent from contactor 11 is passed through line 13 to settler 14 wherein two liquid phases separate. The liquid phase 15, the lighter of the two phases, is rich in ditertiary butyldisulfide product and has a purity of over 90 per cent. The heavier liquid phase 16 comprises the partially spent oxidizing solution. Liquid phase 16 is passed through line 23 to regeneration zone 18 which is packed with berl saddles or Raschig rings or the like. The liquid entering zone 18 through line 23 is passed downwardly therein in countercurrent flow with an oxygen-containing gas, usually air, at a temperature usually in the range of 140 to 160° F. Air is introduced to the regeneration system through line 17 and is distributed therein through perforate means 19. Reactivated oxidizing solution is collected in the reservoir 20 below regeneration zone 18. The regeneration is controlled so as to permit the proper contact of partially spent oxidizing solution with oxygen-containing gas to provide a reactivated solution in the desired state of oxidation, as described hereinbefore. Reactivated solution from reservoir 20 is recycled to contactor 11 through lines 22 and 12. Fresh oxidizing solution may be introduced to the system through line 21. The water content of the oxidizing solution in zone 11 is preferably in the range of 5 to 10 per cent. Consequently, by-product water formed in regeneration zone 18 in accordance with Equation 4 discussed hereinbefore, is removed from zone 18 to an extent so as to maintain the proper water concentration in the reactivated oxidizing solution in line 12.

The removal of by-product water in zone 18 may be effected by virtue of its being carried out in the regeneration off gas leaving zone 18 through line 24. Also present in the regeneration off gas in line 24 are small concentrations of ethylene glycol monomethyl ether and the ditertiary butyldisulfide product. Off gas in line 24 is passed through a cooler 25 to an accumulator 26 wherein water, disulfide product and ether solvent present in the off gas are collected, and wherefrom the off gas is vented through line 27.

Disulfide phase 15 is passed through lines 28 and 30 to distillation zone 31. Material collected in accumulator 26 is passed through lines 29 and 30 to steam distillation zone 31. The proportion of water entering distillation zone 31 is usually adequate for purification by steam distillation of the ditertiary disulfide-glycol ether mixture. However, supplementary steam may be applied to steam distillation zone 31 through line 33, if desired. Overhead product from steam distillation zone 31 comprises water and ditertiary butyldisulfide free of the diethylene glycol monomethyl ether solvent. The overhead product contains about 68 volume per cent water and 32 volume per cent ditertiary ditertiary disulfide product. The overhead product is passed to separation zone 35 through line 34 where the disulfide phase, free of diethylene glycol monomethyl ether solvent, is separated from the water. Kettle product in distillation zone 31, comprising substantially pure diethylene glycol monomethyl ether is recycled to oxidation zone 11 through lines 39 and 12. The water phase in zone 35 is discarded through line 37. Ditertiary butyldisulfide product is passed through line 36 usually to a drying step, and then to storage.

Another modification of the above described process comprises simultaneously passing oxygen-containing gas and the reactants to an oxidation zone. In this case, regeneration of partially spent oxidizing solution takes place in the oxidation zone. Total liquid effluent is passed to a settler wherein product rich liquid phase and the solvent phase separate and wherefrom the solvent phase is recycled directly to the oxidation zone which in such cases preferably comprises a reactor column. The product rich phase is passed to a steam distillation zone and the purification of the disulfide phase and the recycle of the kettle product are conducted in accordance with the manner described above.

In another modification of our process wherein a glycol ether such as diethylene glycol monobutyl ether is utilized, the liquid effluent is in a single phase. The process in this case is optionally conducted with respect to regeneration of spent oxidizing solution although the regeneration is preferably conducted in situ. When such a solvent is used, a conventional fractionation step, usually conducted at reduced pressure, is employed in the separation of the disulfide product from the oxidizing solution.

In still another modification of our process wherein a solvent such as ethylene glycol monomethyl ether, which forms an azeotrope with water, is utilized, two liquid phases are recovered, but purification of the disulfide phase is conducted by means other than a steam distillation. Under such circumstances the product phase is purified either by conventional fractionation procedure or preferably by water washing.

For convenience and clarity certain apparatus such as pumps, surge tanks, accumulators, valves, etc., have not been shown in the drawing. Obviously such modifications of the present invention may be practiced without departing from the scope of the invention or from the scope of the claims.

It is thus seen that certain of our novel solvents are preferred for utilization in our process for the reason that they afford not only the advantage of retaining the copper mercaptide intermediate product in reaction solution, but also for the reason that they afford a simplified means of product purification. We prefer to conduct the oxidation of mercaptans in accordance with our process when utilizing diethylene glycol monomethyl ether since the steam distillation step and the addition of normal hexane to the regeneration zone are each utilized to their fullest advantage for the reasons already discussed. The diethylene glycol monoalkyl ethers and the dipropylene glycol monoalkyl ethers can be utilized in a manner similar to that of the diethylene glycol monomethyl ether so long as the number of carbon atoms in the alkyl is less than 4. When the alkyl contains 4 or more carbon atoms, the effluent product is recovered in a single liquid phase.

Advantages of this invention are illustrated by the following example. The reactants and their proportions and other specific ingredients are presented as being typical and should not be construed to limit the invention unduly.

Tertiary butyl mercaptan is charged to a centrifugal contactor at a rate of 8.2 gallons per hour simultaneously with reactivated oxidizing solution being recycled from a regeneration column at a rate of 70 gallons per hour and from the kettle of a steam distillation system at a rate of 0.93 gallon per hour. The oxidizing solution consists of diethylene glycol monomethyl ether in which is dissolved cupric chloride dihydrate in a weight ratio to the solvent of 1:5. The effluent containing two liquid phases is passed from the contactor to a 200 gallon settler at a temperature of 160° F. The lighter of the two liquid phases, rich in ditertiary butyldisulfide, is passed to a steam distillation zone at the rate of 7.9 gallons per hour. The heavier of the two liquid phases rich in oxidizing solution, is pumped to the top of a packed regeneration column at a rate of 70.5 gallons per hour and reactivated therein while flowing downwardly in countercurrent flow to air entering the regeneration column through a diffusion plate at the bottom at the rate of 443 cu. ft. per hour. Excess by product water is carried overhead from the regeneration column in the off gas along with small concentrations of oxidizing solution and disulfide products, at a rate of 0.5 gallon per hour and cooled and condensed from the off gas and collected in a surge tank, wherefrom the off gas is vented. The condensate is passed from the surge to a steam distillation column. Ditertiary butyl disulfide is separated from the overhead of the steam distillation zone and is passed to a drying system at the rate of 7.1 gallons per hour. Water present in the steam distillation overhead is cooled and discarded. Make-up HCl, when required, is introduced to the kettle product of the steam distillation column, and recycled therewith to the contactor.

As will be evident to those skilled in the art, various modifications can be made or followed, in the light of the foregoing disclosure and discussion, without departing from the spirit or scope of the disclosure or from the scope of the claims.

We claim:

1. In the process for the oxidation of tertiary butyl mercaptan to ditert.-butyldisulfide in the presence of an oxidizing reagent comprising a hydrous cupric halide of the group consisting of chloride and bromide, the improvement which comprises effecting said oxidation when said reagent is dissolved in a monoalkyl glycol ether together with from 3 to 20 per cent by weight of water.

2. The improvement in accordance with claim 1 wherein said ether is diethylene glycol monomethyl ether.

3. The improvement in accordance with claim 1 wherein said ether is ethylene glycol monomethyl ether.

4. The improvement in accordance with claim 1 wherein said ether is diethylene glycol monobutyl ether.

5. A method for the oxidation of an alkyl mercaptan to the corresponding disulfide which comprises introducing said mercaptan to an oxidation zone in the presence of an oxidizing solution at a temperature in the range of 120 to 175° F., said oxidizing solution comprising a monoalkyl glycol ether containing a hydrous cupric halide of the group consisting of chloride and bromide together with water in a concentration in the range of 3 to 20 per cent by weight in which the monoalkyl radical contains not more than 8 carbon atoms and the glycol group is one of the group consisting of ethylene glycol, diethylene glycol, propylene glycol, and dipropylene glycol, recovering from the total effluent of said oxidation zone partially spent oxidizing solution, and regenerating said solution by flowing an oxygen-containing gas therethrough at a temperature below 175° F., recycling reactivated oxidizing solution to said oxidation zone, and recovering said disulfide product from said effluent.

6. A method for the oxidation of an alkyl mercaptan to the corresponding disulfide which comprises introducing said mercaptan to an oxidation zone in the presence of an oxygen-containing gas flowing therethrough and in the presence of an oxidizing solution at a temperature in the range of 120 to 175° F., said oxidizing solution comprising a monoalkyl glycol ether containing dissolved hydrated cupric chloride, said monoalkyl containing not more than 8 carbon atoms, removing liquid effluent from said oxidation zone and recovering therefrom said oxidizing solution and said disulfide product, and recycling said oxidizing solution to said oxidation zone.

7. In the process of producing an alkyl disulfide by the oxidation of a mercaptan in the presence of an oxidation reagent comprising aqueous cupric halide of the group consisting of chloride and bromide, the improvement which comprises effecting said oxidation when said reagent is dissolved in a monoalkyl glycol ether together with water, the concentration of water therein being in the range of 3 to 20 per cent by weight, said glycol being one of the group consisting of ethylene glycol, diethylene glycol, propylene glycol and dipropylene glycol.

8. A method for the preparation of ditert.-butyldisulfide by the oxidation of tertiary butyl mercaptan, which comprises contacting said mercaptan with an oxidizing solution in an oxidation zone at a temperature in the range of 120 to 175° F., said oxidizing solution comprising cupric chloride dihydrate dissolved in monomethyl ether of ethylene glycol and water, the water content of said solution being within the range of 3 to 20 per cent by weight, removing liquid effluent from said oxidation zone and recovering therefrom a first liquid phase rich in ditert.-butyldisulfide product and a second liquid phase rich in partially spent oxidizing solution, regenerating said second phase by contacting same in a regeneration zone with an oxygen-containing gas at a temperature below 175° F., recycling to said oxidation zone reactivated oxidizing solution, contacting said first phase with water so as to extract oxidizing solution contained therein as an impurity, and recovering ditert.-butyldisulfide.

9. A method for the preparation of ditert.-butyldisulfide by the oxidation of tertiary butyl mercaptan, which comprises contacting said mercaptan with an oxidizing solution in an oxidation zone at a temperature in the range of 120 to 175° F., said oxidizing solution comprising cupric chloride dihydrate dissolved in monomethyl ether of diethylene glycol and water, the water content of said solution being within the range of 3 to 20 per cent by weight, recovering from total effluent of said oxidation zone a first liquid phase rich in ditert.-butyldisulfide and a second liquid phase rich in partially spent oxidizing solution, regenerating said second phase by contacting same at a temperature below 175° F. in a separate regeneration zone with an oxygen-containing gas flowing therethrough, recycling reactivated oxidizing solution to said oxidation zone, separating from said first phase in a steam distillation zone substantially pure diethylene glycol monoethyl ether as a kettle product and ditert.-butyldisulfide and water as an overhead product, recycling said kettle product to said oxidation zone, and recovering ditert.-butyldisulfide from said overhead product.

10. In the method of claim 9 the step of introducing a paraffin hydrocarbon boiling in the range of 140 to 160° F. into said regeneration zone whereby the water formed as a by-product of the regeneration is substantially completely removed from said regeneration zone.

11. A method for the preparation of an alkyl disulfide by the oxidation of a mercaptan which comprises introducing said mercaptan to an oxidation zone to effect oxidation of same to the corresponding disulfide in the presence of an oxidizing solution comprising cupric chloride dihydrate dissolved in diethylene glycol monoalkyl ether and water, the water content of said solution being in the range of 3 to 20 per cent by weight and the said monoalkyl radical of said diethylene glycol monoalkyl ether containing less than 4 carbon atoms, recovering from the effluent of said oxidation zone a first phase rich in alkyl disulfide product and a second phase rich in partially spent oxidizing solution, regenerating said second phase in a regeneration zone by contacting same with an oxygen-containing gas flowing therethrough, recycling to said oxidation zone reactivated oxidizing solution containing water to maintain the water concentration in said oxidizing solution, recovering from said first phase in a steam distillation zone a kettle product comprising oxidizing solution and an overhead product comprising water and alkyl disulfide product, recycling said kettle product to said oxidation zone, and recovering alkyl disulfide product from said overhead.

12. A method for the preparation of an alkyl disulfide by the oxidation of a mercaptan which comprises introducing a mercaptan to an oxidation zone in the presence of paraffin hydrocarbon boiling in the range of 140 to 160° F., in the presence of an oxygen-containing gas flowing therethrough and in the presence of an oxidizing solution to effect oxidation of said mercaptan to the corresponding disulfide, said oxidizing solution comprising a water soluble cupric salt and a water soluble halide of the class consisting of bromide and chloride dissolved in monoalkyl ether of diethylene glycol and water, the water content of said solution being in the range of 3 to 20 per cent, said monoalkyl containing less than 4 carbon atoms, recovering from the effluent of said oxidation zone a first and a second liquid phase respectively rich in alkyl disulfide product and oxidizing solution, recycling said second phase to said oxidation zone and recovering from said first phase in a steam distillation zone a kettle product comprising oxidizing solution and an overhead product comprising alkyl disulfide product and water, recycling said kettle product to said oxidation zone, and recovering alkyl-disulfide product from said overhead.

13. A method for the oxidation of an alkyl mercaptan to the corresponding disulfide which comprises introducing said mercaptan together with a paraffin hydrocarbon boiling in the range of 140 to 160° F. to an oxidation zone in the presence of oxygen-containing regeneration gas flowing therethrough and in the presence of an oxidizing solution comprising a water soluble cupric salt, a water soluble chloride, and from 3 to 20 percent by weight of water dissolved in a glycol monoalkyl ether to effect said oxidation, removing liquid effluent from said oxidation zone and recovering oxidizing solution therefrom, recycling said oxidizing solution to said oxidation zone, and recovering alkyl disulfide product from said effluent.

14. A method for the preparation of an alkyl disulfide by the oxidation of a mercaptan which comprises introducing said mercaptan to an oxidation zone in the presence of an oxidizing solution comprising hydrated cupric chloride dissolved in a glycol monoalkyl ether to effect oxidation of said mercaptan to the corresponding disulfide, regenerating in a regeneration zone spent oxidizing solution contained in the effluent from said oxidation zone in the presence of a paraffin hydrocarbon boiling in the range of 140 to 160° F. by contacting same with an oxygen-containing gas, removing water formed as a by-product of said regeneration with said paraffin hydrocarbon from said regeneration zone, recycling reactivated oxidizing solution to said oxidation zone, and recovering alkyl disulfide product from said effluent.

15. A method for the preparation of an alkyl disulfide by the oxidation of a mercaptan which comprises introducing said mercaptan to an oxidation zone in the presence of an oxidizing solution comprising a water soluble cupric salt, a water soluble chloride salt, and from 3 to 20 per cent by weight of water dissolved in a glycol monoalkyl ether to effect said oxidation, regenerating in a regeneration zone partially spent oxidizing solution recovered from effluent of said oxidation zone by contacting same with an oxygen-containing gas, removing regeneration by-product water from said regeneration zone, recycling reactivated oxidizing solution to said oxidation zone, and recovering alkyl disulfide product from said effluent.

16. In a process for converting a mercaptan to a disulfide by oxidation in the presence of a hydrous cupric halide selected from one of the group consisting of chloride and bromide, the improvement which comprises effecting said oxidation in the presence of a reagent comprising a solution of a cupric salt and said halide in a solvent comprising a monoalkyl glycol ether and 3 to 20 per cent by weight of water.

17. A process for the oxidation of mercaptans present in a mercaptan stock in a concentration up to substantially 100 per cent, to the corresponding disulfide, comprising contacting said mercaptan in an oxidation zone with an oxidizing solution comprising a monoalkyl ether containing from 3-20 per cent water and cupric ion and halide ions selected from the group consisting of chloride and bromide, said monoalkyl ether being selected from the group consisting of monoalkyl ethers of ethylene glycol, diethylene glycol, propylene glycol, and dipropylene glycol and said monoalkyl containing up to 8 carbon atoms, maintaining a temperature in said oxidation zone not lower than 80° F. and not higher than 175° F., and recovering said disulfide as a product of the process.

18. A process for the oxidation of substantially pure tertiary butyl mercaptan to ditert.-butyl disulfide comprising contacting said mercaptan with an oxidizing solution comprising diethylene glycol monomethyl ether containing from 3 to 20 weight per cent water and cupric ions and halide ions selected from the group consisting of chloride and bromide, at a temperature in the range of from 80–160° F., recovering total liquid product from said contacting and recovering therefrom a first liquid phase rich in ditert.-butyl disulfide and a second liquid phase rich in partially spent oxidizing solution, regenerating said second phase by contacting same at a temperature below 175° F. with an oxygen-containing gas, recycling regenerated oxidizing solution to said contacting, separating from said first phase in a steam distillation zone substantially pure diethylene glycol monomethyl ether as a kettle product and ditert.-butyl disulfide and water as an overhead product, recycling said kettle product to said contacting, and recovering ditert.-butyl disulfide from said overhead product.

PAUL F. WARNER.
JOHN A. McBRIDE.

REFERENCES CITED

The following references are of record in the file of this patent:

UNITED STATES PATENTS

| Number | Name | Date |
|---|---|---|
| 1,810,369 | Peterkin | June 16, 1931 |
| 2,094,485 | Buell | Sept. 28, 1937 |
| 2,264,220 | Schulze | Nov. 25, 1941 |
| 2,415,852 | Schulze et al. | Feb. 18, 1947 |

OTHER REFERENCES

Schulze et al.: "Control of Copper Sweetening," Oil and Gas Journal, Nov. 25, 1937, pages 56, 57 and 59.